United States Patent
Spejna et al.

(12) 
(10) Patent No.: US 6,789,659 B2
(45) Date of Patent: Sep. 14, 2004

(54) STATOR WINDING SYSTEM AND METHOD WITH PALLET ON PALLET ARRANGEMENT

(75) Inventors: Christopher R. Spejna, Vandalia, OH (US); Taggert McGough, Dayton, OH (US); David E. Clark, Troy, OH (US)

(73) Assignee: Odawara Automation, Inc., Tipp City ( * ) Notice: Subject to any disclaimer, the term of this patent is extended or adjusted under 35 U.S.C. 154(b) by 0 days.

(21) Appl. No.: 09/935,298

(22) Filed: Aug. 22, 2001

(65) Prior Publication Data

US 2003/0121758 A1 Jul. 3, 2003

(51) Int. Cl.⁷ .............................................. B65G 37/00
(52) U.S. Cl. ................................ 198/346.1; 242/432.6
(58) Field of Search ..................... 198/346.1; 242/432.4, 242/432.6

(56) References Cited

U.S. PATENT DOCUMENTS

| | | | |
|---|---|---|---|
| 4,106,185 A | 8/1978 | Lauer | |
| 4,289,228 A | 9/1981 | Reim et al. | |
| 4,306,646 A | * 12/1981 | Magni | 198/341.05 |
| 4,713,883 A | 12/1987 | Santandrea et al. | |
| 4,938,334 A | * 7/1990 | McGinn | 198/346.1 |
| 5,065,499 A | 11/1991 | Luciano et al. | |
| 5,149,000 A | 9/1992 | Santandrea et al. | |
| 5,373,623 A | 12/1994 | Santandrea et al. | |
| 5,658,477 A | 8/1997 | Kirker et al. | |
| 5,662,317 A | 9/1997 | Beakes et al. | |
| 5,735,219 A | 4/1998 | Kirker et al. | |

* cited by examiner

Primary Examiner—Joe Dillon, Jr.
(74) Attorney, Agent, or Firm—Thompson Hine LLP

(57) ABSTRACT

A stator winding system and method includes a winding pallet on transport pallet arrangement, with the winding pallet holding the stator and being removed from the transport pallet for a winding operation.

32 Claims, 10 Drawing Sheets

STATOR WINDING SYSTEM AND METHOD WITH PALLET ON PALLET ARRANGEMENT

TECHNICAL FIELD

The present invention relates generally to stator manufacturing and, more particularly, to a system and method for winding stators using a winding pallet on transport pallet arrangement.

BACKGROUND OF THE INVENTION

Stator manufacturing lines have in the past included a conveyor extending from station to station of the manufacturing process. In some cases winding operations have taken place using machines which remove the stator from the main manufacturing process lane and send the stator to a winding machine via a winding machine conveyor lane extending perpendicular to the main manufacturing process conveyor lane. Such arrangements increase costs and substantially increase the size of the foot print for the machinery. While arrangements in which the stator winder is placed adjacent the main manufacturing conveyor lane are known as from U.S. Pat. No. 4,713,883, such arrangements are limited in speed and have not generally been suitable for winding techniques utilizing shrouds. Other known arrangements utilize an indexing or dial-type arrangement such as that shown in U.S. Pat. No. 5,149,900. However, the indexing arrangement is typically limited in only having four stations and tends to be costly.

Accordingly, it would be advantageous to provide a stator winding method and system suitable for quickly winding stators at a winding position adjacent the conveyor lane.

SUMMARY OF THE INVENTION

In one aspect, a stator winding method involves the steps of: (a) providing a transport pallet and a winding pallet, the winding pallet removably positioned upon the transport pallet; (b) conveying the transport pallet with winding pallet thereon along a conveyor in a substantially horizontal first direction to an input side of a winding station; (c) raising the transport pallet with winding pallet thereon above the conveyor; (d) holding the winding pallet in place as the transport pallet is lowered so as to separate the winding pallet from the transport pallet; (e) laterally moving the winding pallet in the first direction and into a first pivot arm; (f) pivoting the winding pallet through substantially ninety degrees to a first position alongside a winding position; (g) laterally moving the winding pallet in the first direction out of the first pivot arm and into the winding position; (h) performing a winding operation at the winding position; (i) laterally moving the winding pallet in the first direction into a second position alongside the winding position and into a second pivot arm; (j) pivoting the winding pallet through substantially ninety degrees to a position above the conveyor; (k) laterally moving the winding pallet in the first direction out of the second pivot arm and into a pallet combining position and holding the winding pallet in the pallet combining position; (l) laterally moving the transport pallet along the conveyor into a position below the pallet combining position; (m) raising the transport pallet up into contact with the winding pallet; (n) releasing the winding pallet so as to rest upon the transport pallet; and (o) lowering the transport pallet with winding pallet thereon back onto the conveyor.

In another aspect, a stator winding method involves the steps of: (a) providing a transport pallet and a winding pallet, the winding pallet removably positioned upon the transport pallet; (b) conveying the transport pallet with winding pallet thereon to an input side of a winding station; (c) separating the transport pallet from the winding pallet; (d) pivoting the winding pallet into a first position alongside a winding position; (e) laterally moving the winding pallet into the winding position; (f) performing a winding operation at the winding position; (g) laterally moving the winding pallet into a second position alongside the winding position; (h) pivoting the winding pallet away from the second position and into a third position; and (i) placing the winding pallet back onto the transport pallet In a further aspect, a stator winding system for conveying and winding a stator mounted on a winding pallet is provided, the winding pallet removably positioned on a transport pallet. The system includes a conveyor, a pallet separation station at an upstream side of a winding machine; and an elevator below the pallet separation station, the elevator lifting the transport pallet with winding pallet thereon off the conveyor and up to the pallet separation station. A pair of gripping arms are provided for moving into a holding arrangement with the winding pallet at the pallet separation station. An upstream pivot arm is positioned adjacent the pallet separation station for receiving the winding pallet from the pair of gripping arms and pivoting the winding pallet through substantially ninety degrees to a position upstream of a winding position of the winding machine.

In yet another aspect, a stator winding system for conveying and winding a stator mounted on a winding pallet is provided, the winding pallet removably positioned on a transport pallet. The system includes a conveyor for transporting the transport pallet with winding pallet thereon. An elevator is movable between a low position and a raised position above the conveyor. A pair of gripping arms are provided at the raised position for holding the winding pallet. A pivot arm is provided for holding the winding pallet and pivoting the winding pallet between at least first and second positions, the first position adjacent the raised position.

In still a further aspect, a stator winding system includes a transport pallet and a winding pallet removably positioned on the transport pallet. The winding pallet is formed by a plate member including an aperture having a stator mounted therein. The aperture permitting access to top and bottom sides of the stator when the winding pallet is removed from the transport pallet.

In another aspect, a system for use with a stator mounted on a winding pallet is provided, the winding pallet removably positioned on a transport pallet. The system includes a conveyor for transporting the transport pallet with winding pallet thereon, means for separating the winding pallet from the transport pallet and means for pivoting the separated winding pallet between at least first and second positions, the second position being upstream of a winding position of a winding machine.

DETAILED DESCRIPTION

Figure 1:
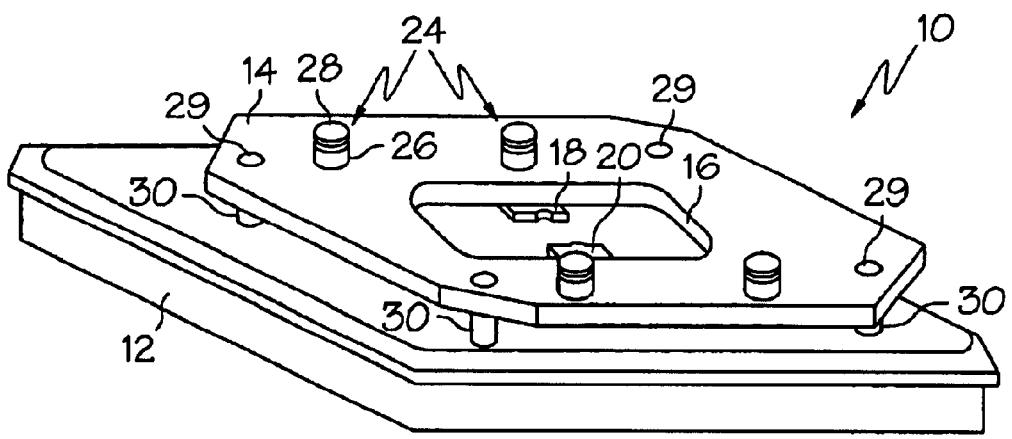
FIG. 1 is an isometric view of a pallet on pallet arrangement.
Figure 2A:
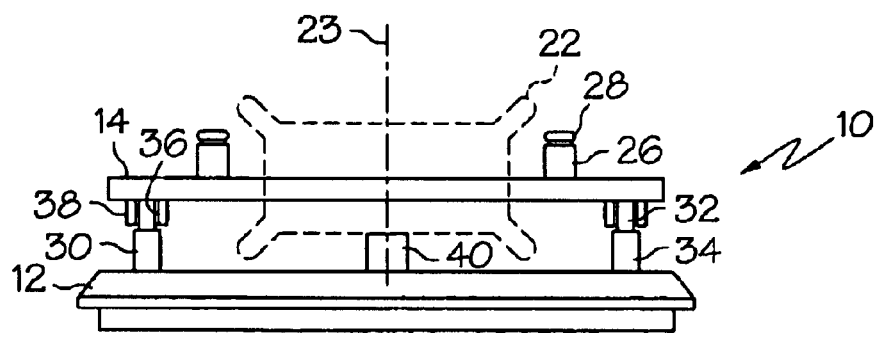
FIG. 2A is a front elevation of the arrangement of FIG. 1.
Figure 2B:
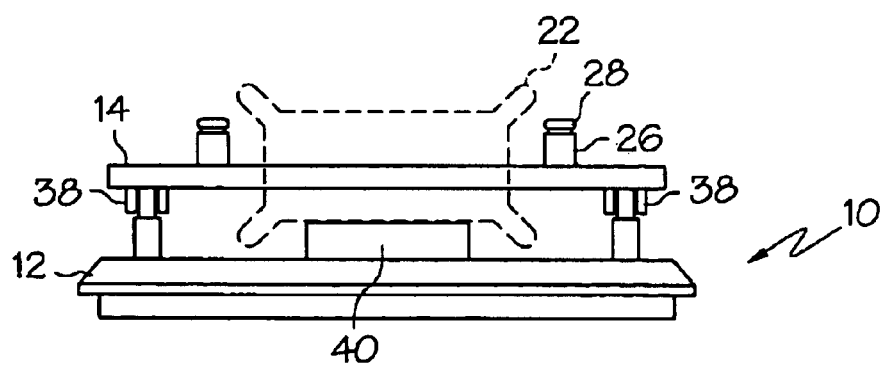
FIG. 2B is a side elevation of the arrangement of FIG. 1.

Referring to FIGS. 1, 2A and 2B, a stator pallet or pallet arrangement 10 is shown and includes a transport pallet 12 and a winding pallet 14 removably positioned on the transport pallet 12. The winding pallet 14 may be formed of a plate member having an aperture 16 in which a stator may be mounted or held via suitable means such as clamping arms 18 and 20. Clamping arm 18 may be fixed while clamping arm 20 may be resiliently biased inward against the stator 22 positioned therein and may also be adjustable. The plate member of the winding pallet 14 may include a plurality of wire retaining studs 24 extending from a top surface thereof for temporarily securing wires. The studs 24 may be formed by a fixed lower part 26 and a downwardly biased (via spring for example) but movable upper part 28 so that wires can be moved into position between the two and held by the downward biasing of the upper part 28. One or more additional holes 29 in the upper and/or lower surface of the plate member may be provided and may, for example, be used to facilitate positioning of the winding pallet 14 at various stages of system operation.

The transport pallet 12 includes a plurality of posts 30 extending upwardly therefrom for supporting the winding pallet 14. In this regard, at least two or more of the posts 30 may be formed to include an upper positioning portion 32 smaller in diameter than a lower portion 34 to aid in assuring that the winding pallet 14 maintains a desired position on the transport pallet 12. For this purpose the winding pallet 14 may include a corresponding plurality of openings 36 formed thereon for receiving upper post portions 32 therein, with the structure defining the perimeter of each opening 36 resting upon an upper surface of post portion 34. In the illustrated embodiment openings 36 may be formed by bushings 38 which are press fit into holes in the plate member of the winding pallet 14. Alternatively, the openings 36 could be defined by the plate member itself. It is also recognized, that an alternative arrangement may include posts extending from the winding pallet 14 and received in openings on the transport pallet 12.

A positioning die or detail 40 attached to the transport pallet 12 is provided for supporting the stator 22 at a certain position (such as a desired reference position for manufacturing operations) relative to the winding pallet 14 when the winding pallet 14 is positioned on the transport pallet 12. In the illustrated embodiment the positioning die 14 is generally rectangular in shape having a narrow width in front view and a relatively larger width in side view. It is recognized that other shapes are possible and that in some cases the positioning die could be formed unitary with the transport pallet 12.

Figure 3:
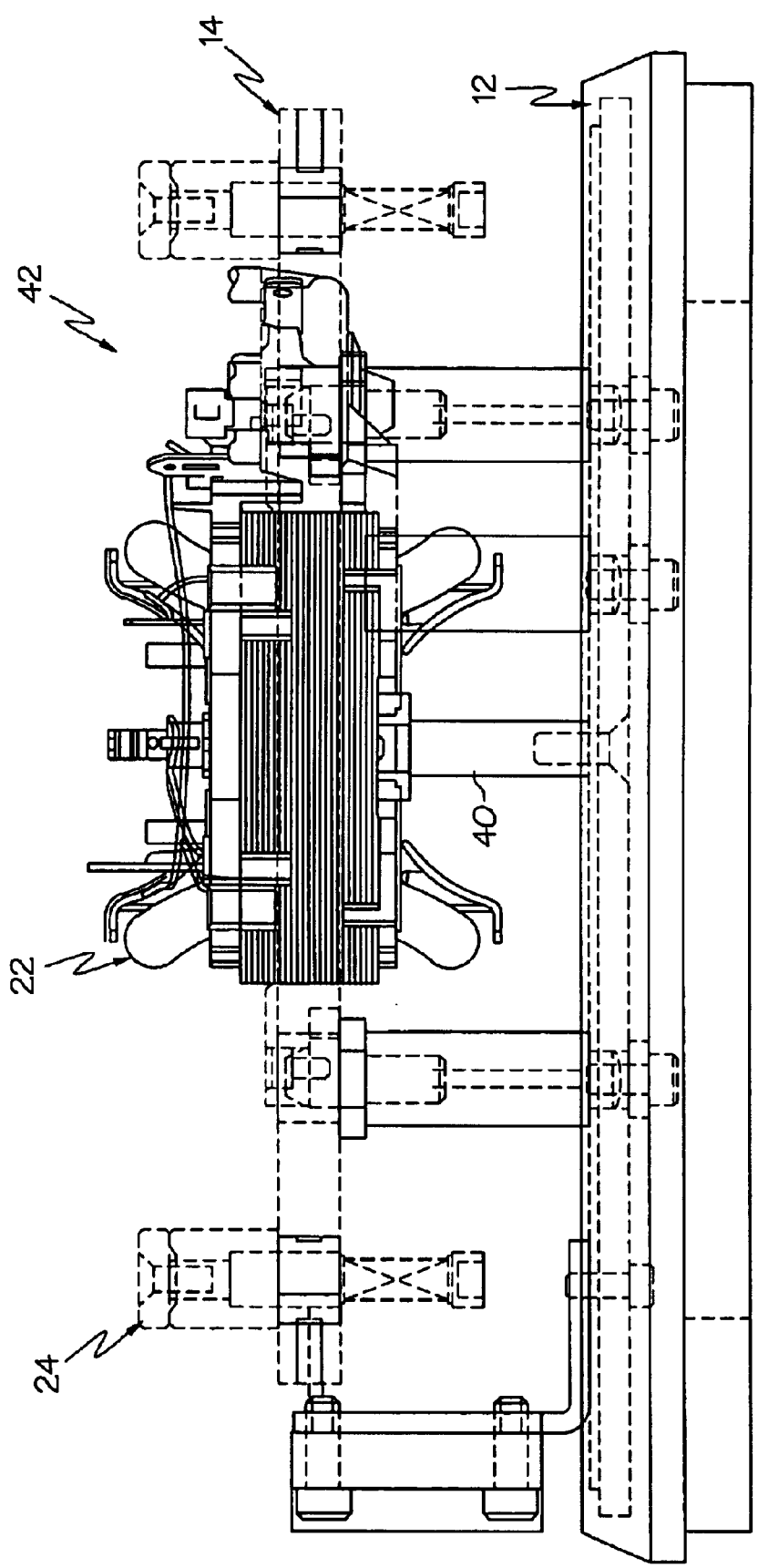
FIG. 3 is a front elevation of another pallet on pallet arrangement.

A more detailed depiction of one embodiment of a winding pallet 14 on transport pallet 12 arrangement 42 is illustrated in FIG. 3.

Figure 4:
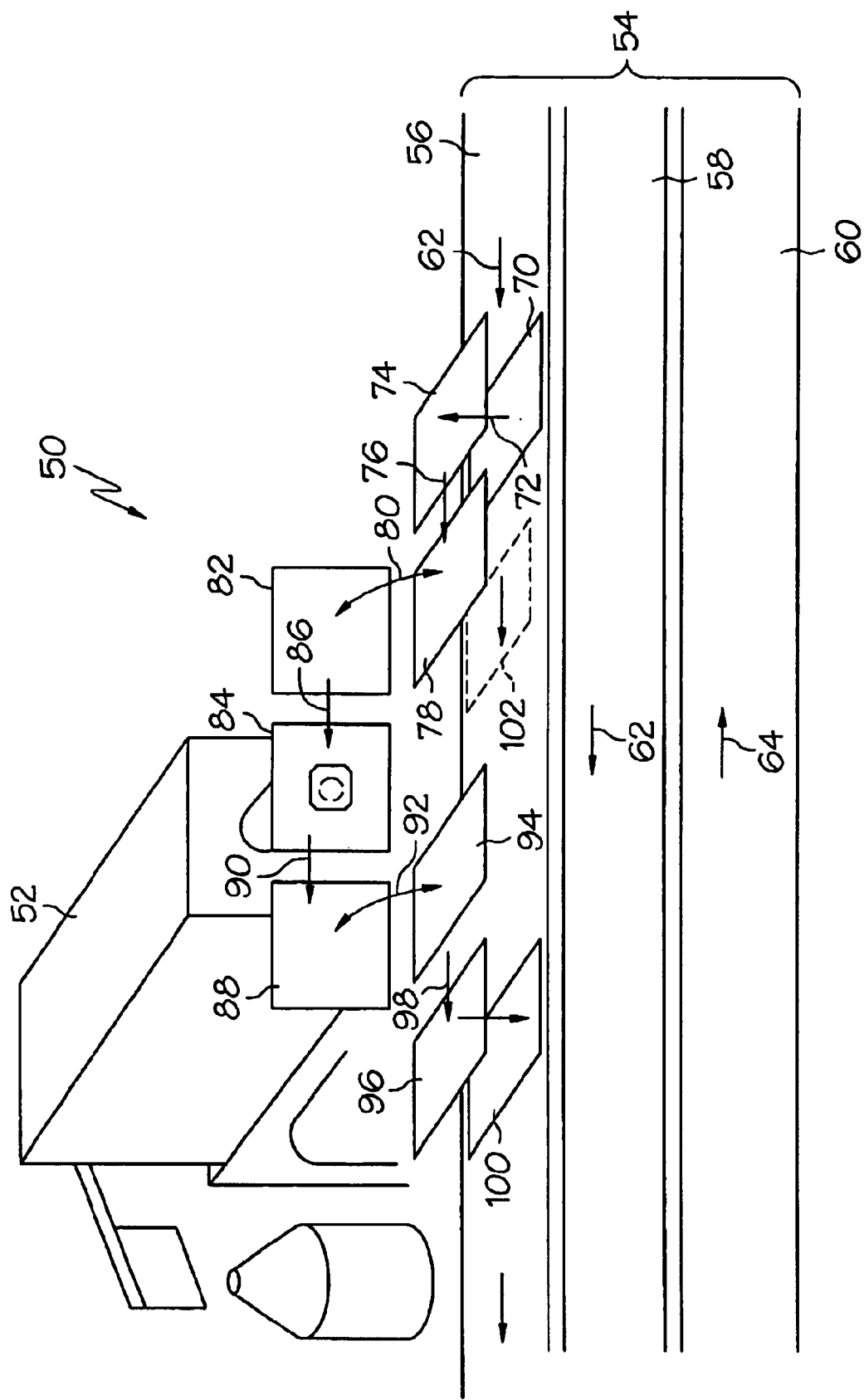
FIG. 4 is a perspective, schematic view illustrating the movement operations in accordance with one embodiment of a stator winding system and method.

Referring now to the system schematic of FIG. 4, an explanation of one embodiment of a stator winding operation useful in conjunction with a stator which is mounted in a winding pallet 14 which in turn is removably positioned on a transport pallet 12 is described. The system 50 includes a stator winding machine 52 positioned alongside a manufacturing line 54. The line 54 may be formed by three conveyor lanes 56, 58 and 60. Lanes 56 and 58 are working lanes of the line 54 and carry stator pallet arrangements 10 in a work flow direction defined by arrows 62. A complete manufacturing system may include a plurality of winding machines and other stations along the line 54. At various points along the line 54 suitable means may be provided for transferring stator pallet arrangements 10 back and forth between lanes 56 and 58. Lane 60 represents a return flow lane moving in an opposite direction 64 which may be used to return transport pallets 12 back to the front of the line 54.

An exemplary stator winding method is now described. In particular, a transport pallet is with winding pallet 14 removably positioned thereon is conveyed down conveyor lane 56 in substantially horizontal direction 62 to an input side of a winding station or machine 52 until position 70 is reached. The conveyor lane 56 is stopped and the transport pallet with winding pallet thereon is raised above the conveyor lane 56 as indicated by arrow 72 to a pallet separation station defined by position 74. The winding pallet 14 is held in place at the pallet separation station 74 as the transport pallet 12 is lowered so as to separate the winding pallet 14 from the transport pallet 12. The winding pallet 14 is then laterally moved as indicated by arrow 76 into an upstream pivot arm located at position 78. The winding pallet 14 is then pivoted upward through substantially ninety degrees as indicated by arrow 80 to an upstream position 82 alongside a winding position 84 of the winding machine 52. The winding pallet 14 is laterally moved out of the upstream pivot arm and into the winding position 84 as indicated by arrow 86. A winding operation is performed on the stator in the winding pallet 14 at the winding position 84. The winding pallet 14 is then laterally moved into a downstream position 88 alongside the winding position 84 and into a downstream pivot arm at position 88 as indicated by arrow 90. The winding pallet 14 is then pivoted downward through substantially ninety degrees as shown by arrow 92 to a position 94 above the conveyor lane 56. The winding pallet 14 is then laterally moved of the downstream pivot arm and into a pallet combining position 96 as indicated by arrow 98, and the winding pallet 14 is held in the pallet combining position 96. By the time the winding pallet 14 reaches position 96, the transport pallet 12 has been conveyed along the conveyor lane 56 into a position 100 below the pallet combining position 96 as indicated at 102. The transport pallet 12 at position 100 is raised up into contact with the winding pallet 14 at position 96 such that the winding pallet 14 is again properly positioned on the transport pallet 12. The winding pallet 14 is then released so as to rest upon the transport pallet 12; and the transport pallet 12 with winding pallet 14 thereon is lowered back down onto the conveyor lane 56 at position 100 where the arrangement can be moved further down the manufacturing line 54 for further manufacturing operations. It is noted that in the illustrated embodiment all lateral moves 76, 86, 90 and 98 of the winding pallet are in the same direction 62 as conveyor lane 56.

Figure 5:
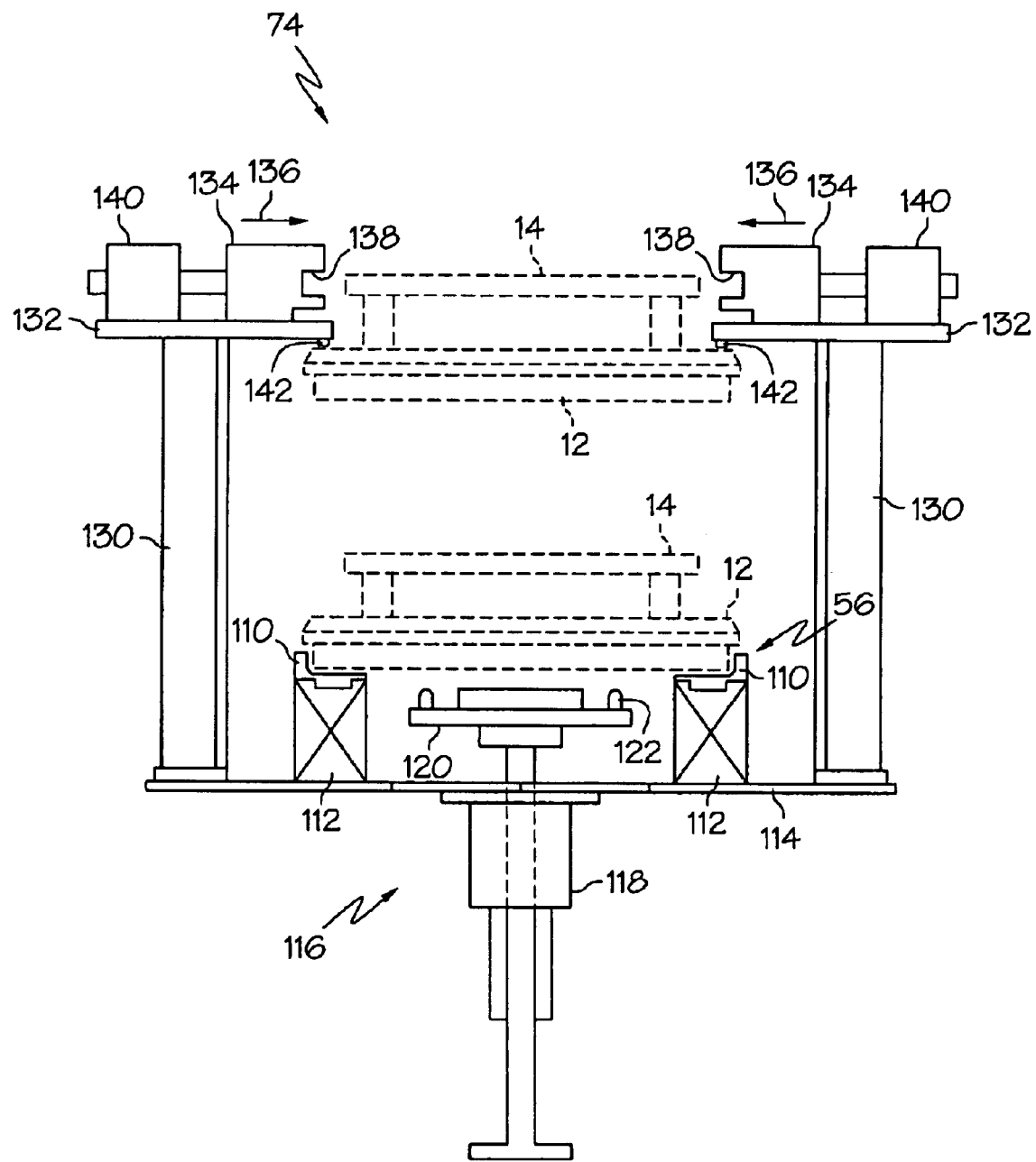
FIG. 5 is an elevation view of positions 70 and 74 of FIG. 4.

Exemplary structures which may be utilized to construct a system 50 which operates as described above are now explained with reference to FIGS. 5–11. Referring first to FIG. 5, a partial elevation view along conveyor lane 56 with direction 62 into the page is depicted. As shown, conveyor lane 56 may be formed by spaced apart, movable conveyor rails 110 which may be supported by suitable structure 112 mounted to a frame 114 of the conveyor line. Also mounted to frame 114 is an elevator or lift mechanism 116 which is operable to move upward between the rails 110 into contact with a bottom portion of transport pallet 12 for lifting the transport pallet 12 and conveyor pallet 14 upward into the pallet separation station 74. In an alternative embodiment the elevator could grasp the transport pallet from one or both sides for lifting to the pallet separation station 74. The transport pallet 12 and winding pallet 14 are shown in dashed lines at both positions, that is, on the conveyor lane 56 and at the pallet separation station 74. In one embodiment the elevator mechanism may take the form of a linearly actuatable pneumatic cylinder assembly 118. An upper portion 120 of the assembly 118 which contacts the transport pallet 12 may take various forms, from that of a simple flat plate to more complex forms which may include positioning posts 122 for engaging corresponding openings on the bottom of transport pallet 12 in order to maintain desired positioning. Regardless of the exact form, when the pneumatic cylinder assembly 118 is actuated the transport pallet 12 and winding pallet 14 are moved upward toward the pallet separation station 74. In this regard, a suitable sensor such as a proximity switch or optical switch may be used to indicate when the pallet arrangement 10 is at the desired position 70 below the pallet separation station 74. For example, in an exemplary Bosch conveyor line a pallet stop gate such as an air-actuated pivoting arm may be normally positioned in an up state between the conveyor rails 110 for stopping the transport pallet and winding pallet combination and may include a proximity switch or other sensor for determining when a pallet is in position 70. The conveyor rails 110 continue moving, sliding relative to the stopped transport pallet. The transport pallet and winding pallet can then be elevated and separated. Once the winding pallet is separated and the transport pallet lowered back onto the conveyor lane 56, the stop-gate may be actuated to a down position to allow the transport pallet to move to downstream position 100. Thus, in the illustrated embodiment the combination of the elevator and the gripping arms act as a pallet separation means.

Also mounted to the frame 114 are support brackets 130 which extend upward along the outer side of each conveyor rail 110. At the top of each bracket 130 a plate portion 132 is provide for the mounting of gripping arms 134 which are moveable inward as indicated by arrows 136. The gripping arms 134 form a pair of opposed slots 138 which are sized and positioned for moving into a supporting or holding arrangement with the side edges of the plate member of winding pallet 14. The supporting or holding arrangement prevents the winding pallet 14 from moving downward back to the conveyor lane 56 but may permit lateral sliding of the winding pallet in opposed slots 138. The gripping arms 134 may be movable via associated pneumatic assemblies 140. Once the gripping arms 134 are moved into a holding position of the winding pallet 14, the elevator 116 may be lowered to separated the transport pallet 12 from the winding pallet 14. The stator 22, of course, stays with the winding pallet 14 upon such separation. The plate portions 132 may include biasing means such as movable, spring-loaded pins 142 which contact a portion of the transport pallet 12 when the transport pallet 12 is in its most upward position. The biasing means provides a small downward force on the transport pallet 12 to help assure separation of the transport pallet 12 from the winding pallet 14 when the elevator 116 is lowered. Suitable proximity switches or other sensors may be used to provide control signals indicating the elevator up position, elevator down position, gripping arms inward position and gripping arms outward position.

Figure 6:
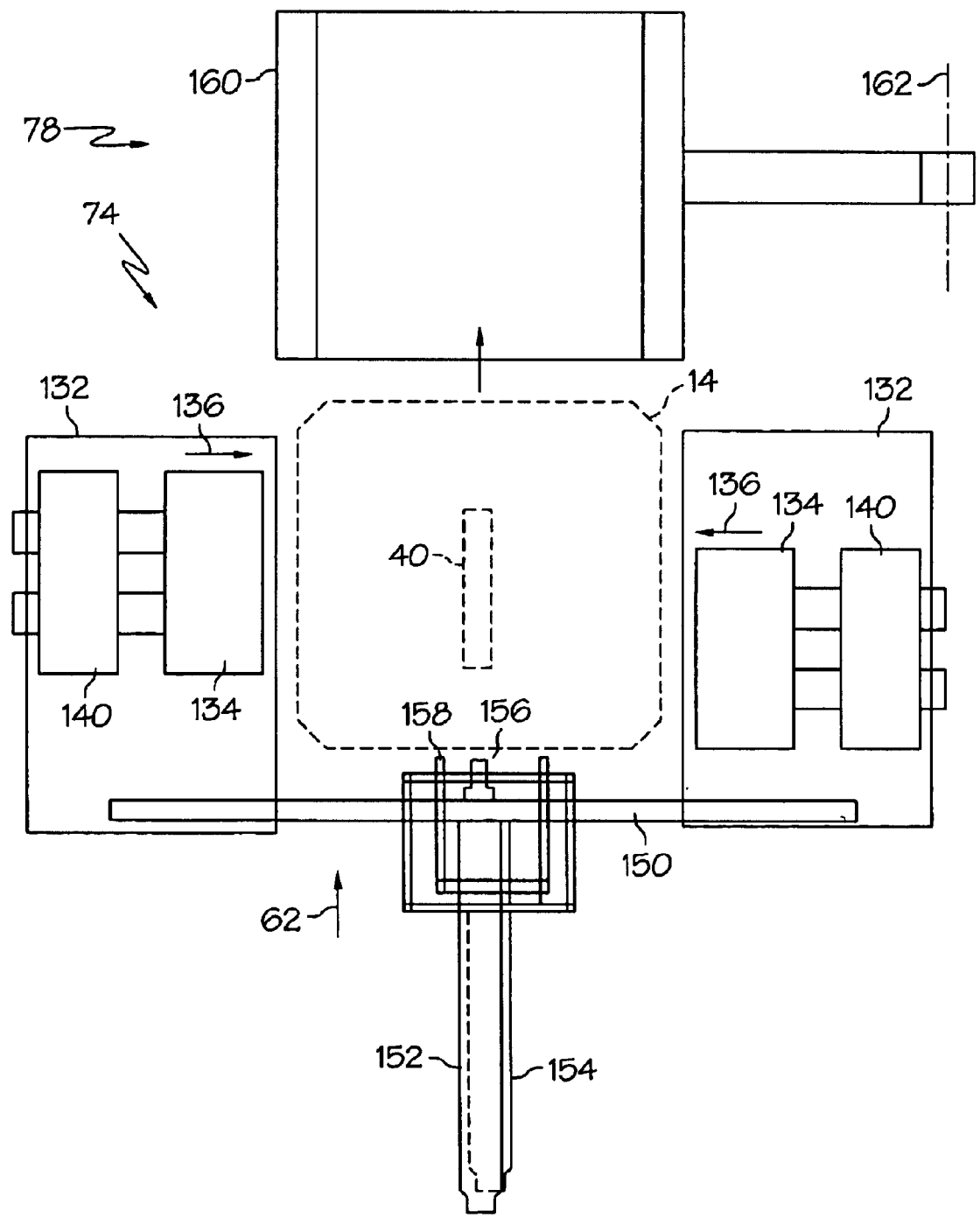
FIG. 6 is a top view of positions 74 and 78 of FIG. 4.
Figure 7:
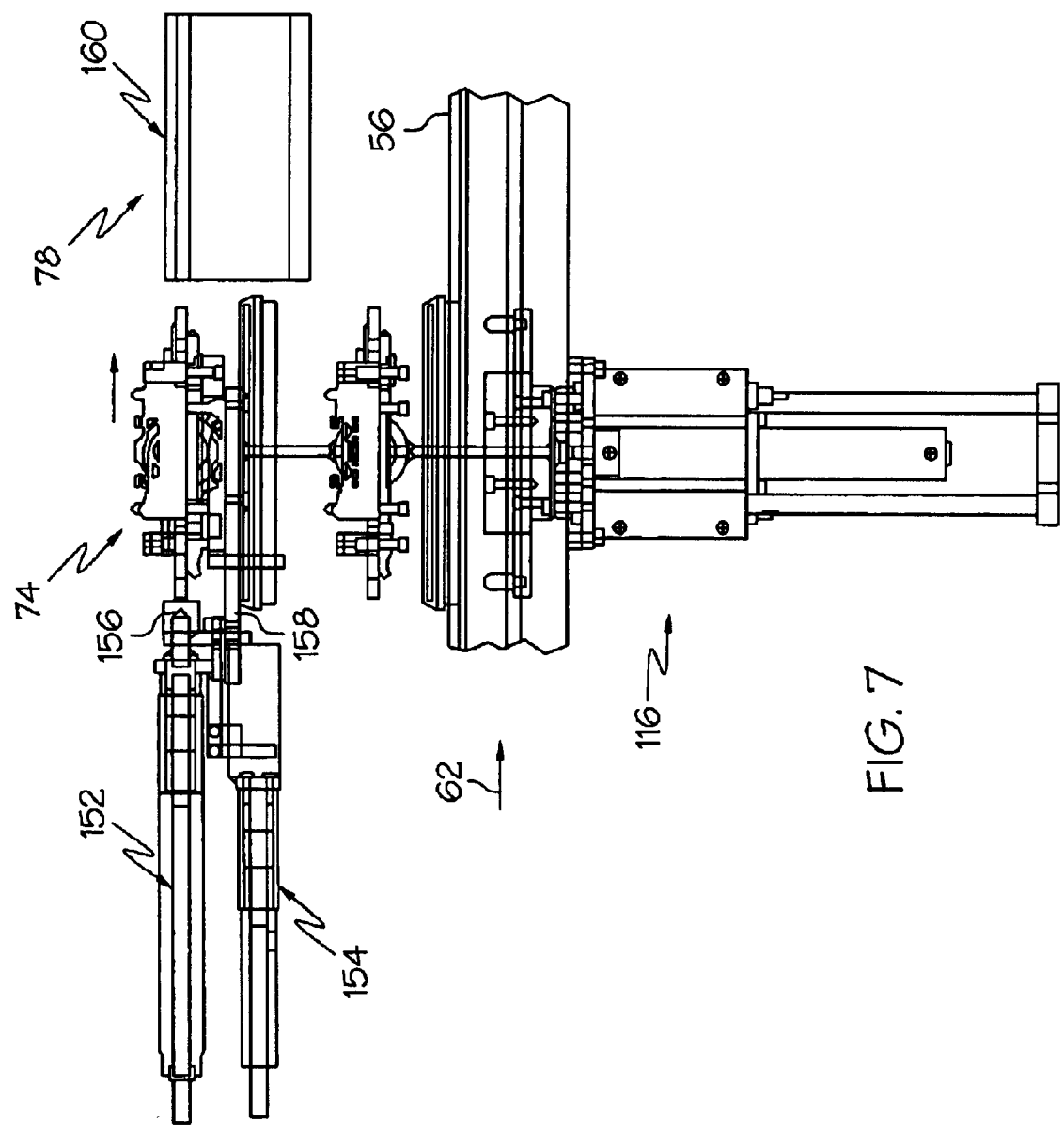
FIG. 7 is a side elevation of FIG. 6.

Referring now to FIG. 6 a top view of separation station 74 and adjacent position 78 is shown. In the illustrated embodiment the gripping arms 134 are shown slightly staggered. Upstream of the separation station 74 a support 150 is mounted laterally to the two plate portions 132. Mounted to the support 150 are two linear actuators 152 and 154 which may also take the form of suitable pneumatic cylinder assemblies. As shown in the side elevation of FIG. 7 the elevation of the actuators 152 and 154 may be offset. The upper actuator 152 includes an actuator member 156 which may take the form of a rod end or a push bar which is aligned for contacting and moving the winding pallet 14 from the separation station 74 into adjacent position 78 where a pivot arm 160 is positioned for receiving the winding pallet for subsequent pivot of the winding pallet about pivot axis 162. The lower actuator 154 may move a fork type member 158 or other structure into position between the winding pallet 14 and the transport pallet 12 before the transport pallet is lowered back onto the conveyor lane 56. When beneath the stator in the winding pallet 14 the fork type member or other structure forming part of actuator 154 prevents supports the stator relative to the winding pallet 14 and prevents the insulation member from dropping out of the stator when the transport pallet 12 is lowered. In this regard, it is contemplated that the transport pallet 12 may be aligned such that the die member 40 is positioned lengthwise relative to direction 62, easily allowing the two sides of the fork type member 158 to move along both sides of the stator in the winding pallet 14. Suitable proximity switches or other sensors may be used for control purposes as indicators of the actuator 154 extended position, actuator 154 retracted position, actuator 152 extended position, actuator 152 retracted position and pallet in arm 160 position.

A similar gripping arm arrangement may be located at the downstream side of the winding machine 52 at position 96 for receiving and holding the winding pallet 14 after winding. A similar elevator mechanism 116 may also be provided at position 100 for raising the transport pallet 12 up into engagement with the winding pallet 14. Of course, at the downstream side there would be no need for the pallet separating biasing means 142 on the underside of the plate portions 132. Additionally, there would be no need for an actuator such as 154 because after winding the insulation will not fall off the stator assembly. Further, while the upstream arrangement shows a push-type linear actuator 152 mounted immediately adjacent the gripping arms 134, at the downstream side a similar push-type linear actuator used for moving the winding pallet 14 from the downstream pivot arm to the downstream gripping arms would be mounted to a frame or bracket just upstream of the downward pivot location 94 of the downstream pivot arm.

Figure 8:
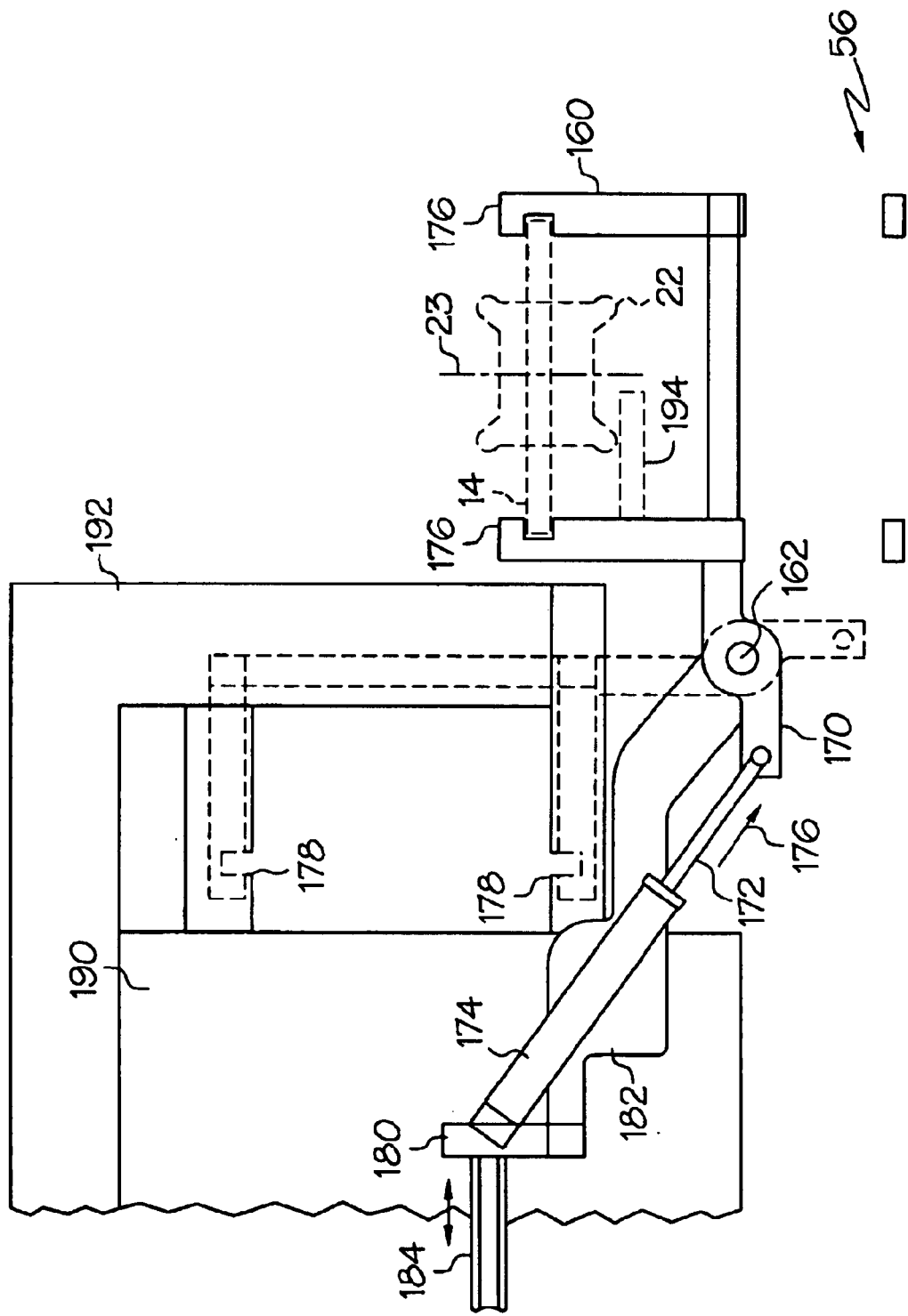
FIG. 8 is an elevation view of one embodiment of a pivot arm pivot arrangement.
Figure 10:
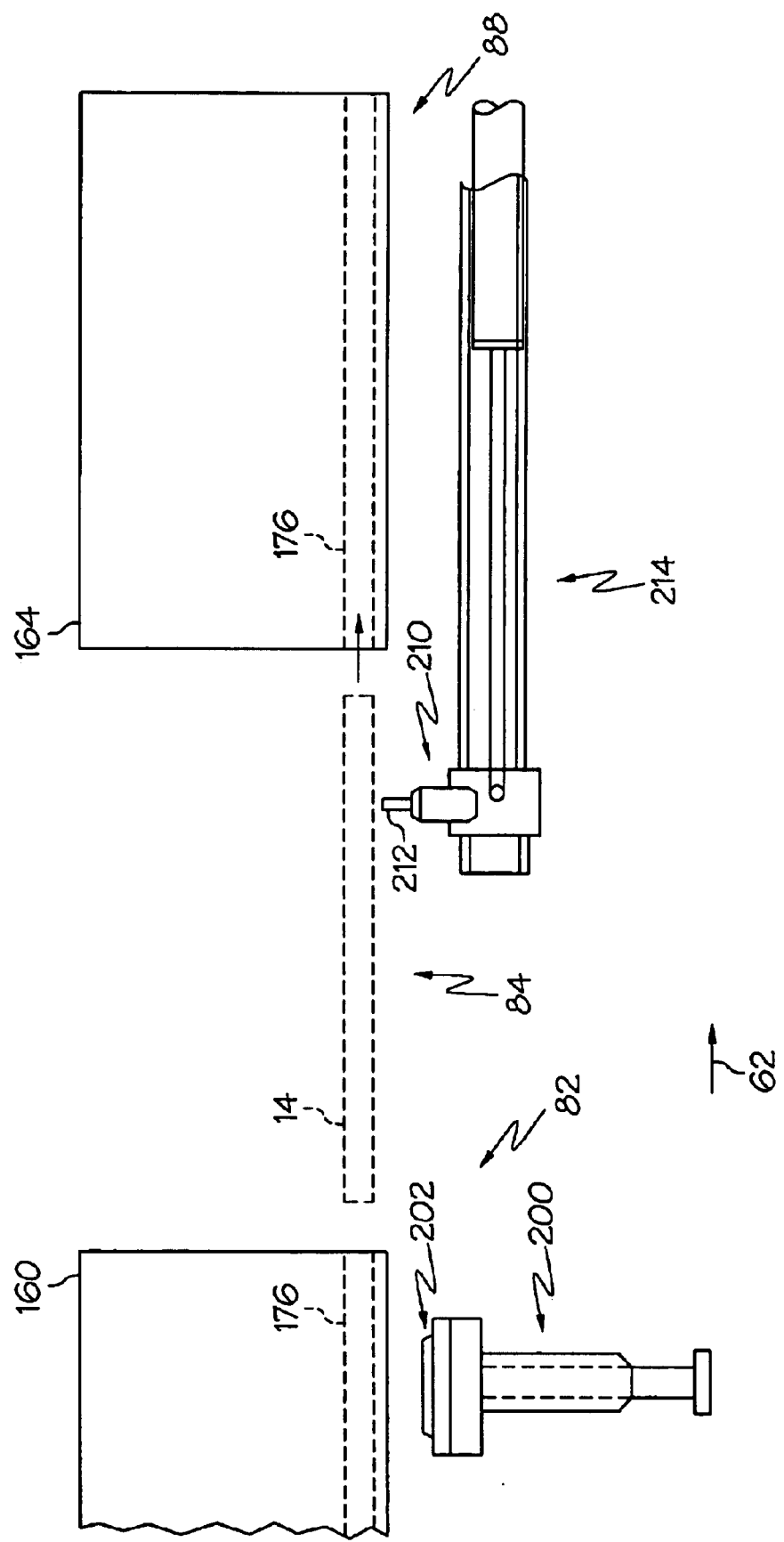
FIG. 10 is a top view of positions 82, 84 and of FIG. 4.
Figure 11:
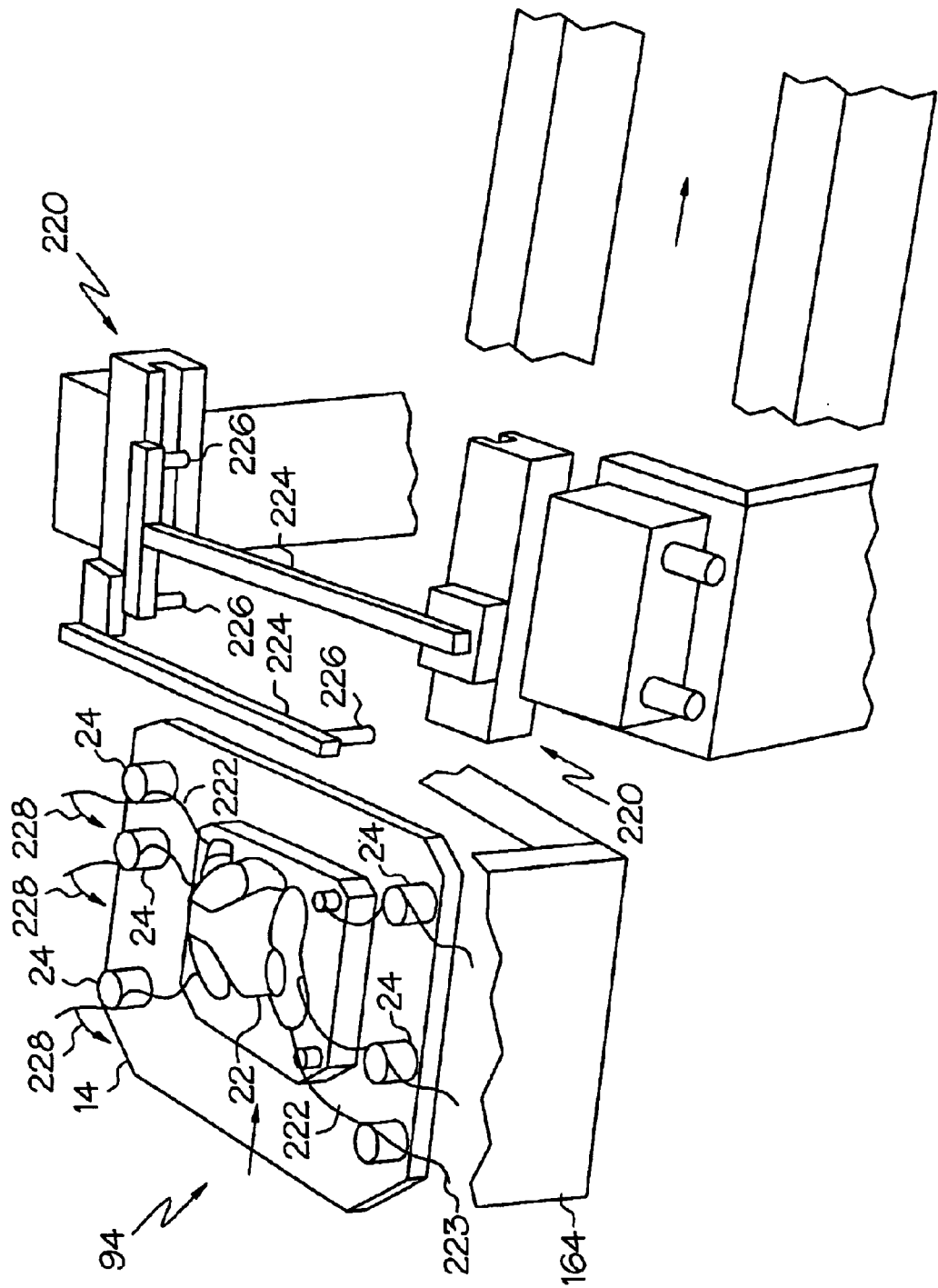
FIG. 11 is a partial perspective view of a downstream pivot arm and downstream gripping arms.

One embodiment of an exemplary pivot arrangement suitable for the pivot arm 160 is shown in the upstream looking side elevation of FIG. 8. It is recognized that this same arrangement could be provided for the downstream pivot arm 164 (FIG. 10). It is also recognized that the upstream and downstream pivot arms 160 and 164 could have differing pivot arrangements. For example, the downstream pivot arm 164 could pivot via the arrangement of FIG. 8 while the upstream pivot arm 160 could be pivoted by a rotational actuator such as a rotating motor with gearing or belt arrangement. The exact mode of pivot is not necessarily critical. Referring again to the arrangement of FIG. 8, the pivot arm 160 or 164 is mounted about a pivot axis 162 and includes lever arm 170. One side of the lever arm 170 is associated with the pallet gripping portion of the arm and the opposite side of the lever arm 170 is pivotally associated with a linear actuator 172 such as the rod of a pneumatic cylinder assembly 174. When the linear actuator 172 is extended in direction 176 the pivot arm pivots about axis 162 through ninety degrees to an upright position shown in shadow. It is noted that an axis 23 of the stator 22 is substantially vertical when the arm is pivoted downward into position above the conveyor lane 56 and the axis 23 is substantially horizontal when the arm is pivoted upward into position adjacent the winding position 84. The upright position corresponds to position 82 for an upstream pivot arm and position 88 for a downstream pivot arm. In either case, when in such upright position opposed slots 176 formed on the pivot arm align with opposed slots 178 formed at the winding position 84 (FIG. 4) of winding machine 52 permitting the winding pallet 14 to be easily slid from upstream position 82 to winding position 84 and from winding position 84 to downstream position 88. Likewise, when the pivot arm 160, 164 is in the downward position its opposed slots 176 align with the opposed slots 138 of its adjacent gripping arms for sliding the winding pallet therebetween. In one embodiment the pivot arm 160, 164 and its associated lever am 172 and pneumatic cylinder assembly 174 may be mounted to frame structures 180 and 182 which in turn are mounted on a track 184 enabling the pivot arm to be moved from its working position shown in FIG. 8 away from the conveyor lane 56 (to the left in FIG. 8) in order to provide access to the winding head assembly. A suitable belt drive or other arrangement could be provided for movement along the track 184. The winding head assembly may include side portions 190 and 192 between which the winding pallet 14 is positioned during winding. Each portion 190 and 192 may include an associated shroud assembly which is moved toward the stator during winding and one portion 190 would also include an associated winding needle and wire feed out arrangement to perform the actual winding operation. The upstream pivot arm 160 may also include structure 194 for supporting the insulation of the stator assembly in the winding pallet 14. Suitable proximity switches or other sensors may be provide with each pivot arm for control purposes to identify the pivot arm up and down positions.

Figure 9:
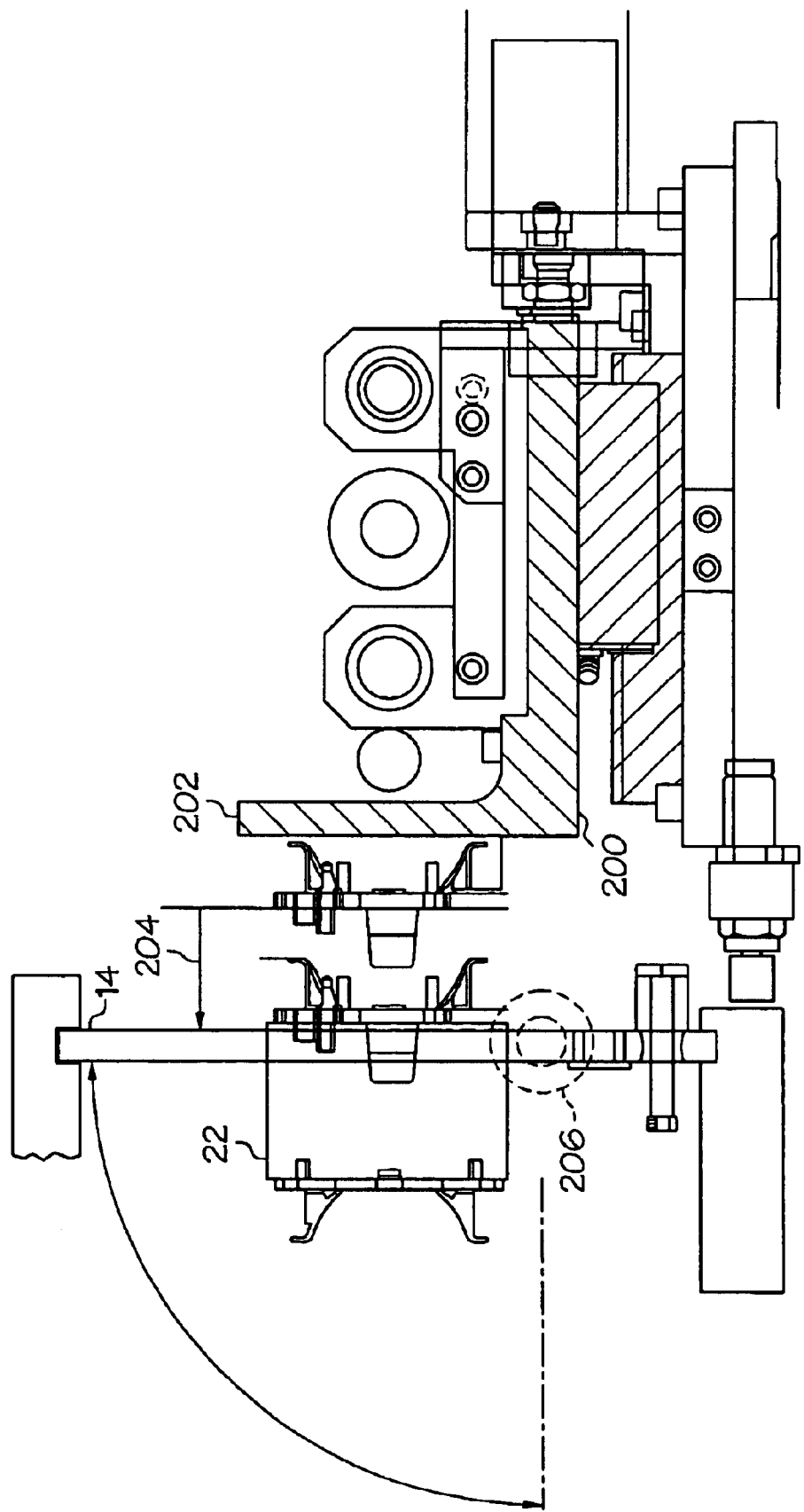
FIG. 9 is an elevation view of position 82 of FIG. 4.

Referring now to FIG. 9, downstream looking elevation view of the winding pallet 14 when in position 82 is shown. Once pivoted into the illustrated position an actuator 200 including a stator engaging head 202 may be moved into contact with the stator 22 to move the stator in direction 204 into a winding reference position relative to the winding pallet 14. The linear actuator 200 may again be formed by a pneumatic cylinder assembly. Movement of the stator 22 to a winding reference position relative to the winding pallet 14 places the stator 22 in a desired position for winding at the winding position. It is recognized that in some cases the stator 22 may always be mounted in a winding reference position relative to the pallet in which case such an adjustment would not be necessary. Also shown in FIG. 9 is another linear actuator 206, such as another pneumatic cylinder assembly, mounted for moving the winding pallet from the illustrated position 82 to the winding position 84 (into the page in the view shown). Again, suitable proximity switches or other sensors may be provide for control purposes to identify actuator 200 extend and retract positions and actuator 206 extend and retract positions.

A top schematic view of upstream position 82, winding position 84 and downstream position 88 is shown in FIG. 10.

A winding pallet 14 is shown in the winding position 84. In one embodiment movement of the winding pallet 14 from the winding position 84 to the downstream position 88 of downstream pivot arm 164 is achieved utilizing a linear actuator 210 (such as a pneumatic arrangement) which may include a pin portion 212 which can be pneumatically extended into a corresponding opening 29 (FIG. 1) on the winding pallet 14. Once the pin portion 212 engages the winding pallet 14, a linear actuator 214 such as a pneumatic cylinder arrangement can be utilized in a pulling operation of the linear actuator 210 to move the winding pallet into the downstream pivot arm 164. It is recognized that it is possible that such movement could also be achieved in other ways such as by allowing a next to load winding pallet being moved from upstream position 82 to winding position 84 to contact and push the just wound winding pallet 14 at winding position 84 to downstream position 88.

Once a winding pallet is moved to downstream pivot arm 164 and pivoted down into position 94, a push-type linear actuator mounted upstream of position 94 is used to slide the winding pallet 14 into the inwardly positioned gripping arms at pallet recombining position 96. In this regard reference is made to the partial schematic of FIG. 11 where the downstream pivot arm 164 is shown in part in its downward pivoted position to place the winding pallet 14 at position 94. Also shown are the downstream gripping arms 220. As shown, after the winding operation of the winding machine the stator coil leads 222 may be placed in retaining studs 24. Typically the coil leads 222 may include an excess of 1–3 inches of wire 223 beyond that which extends to the retaining studs 24. The downstream gripping arms 220 may therefore have associated wire combing arms positioned thereon, each with one or more wire combing pins 226 positioned just laterally of the retaining studs 24 such that when the winding pallet 14 is slid into the gripping arms 220 any excess wire 223 extending laterally outward is moved into contact with the combing pins 226 to move the wire 223 inward toward the winding pallet 14 as shown by arrows 228. One combing pin 226 per side of the winding pallet 14 may be sufficient in some cases, while in other cases it may be desirable to utilize more than one. The combing operation helps assure the excess wire 223 is not in an overhang condition where it could come into contact with some other structure during movement along the conveyor lane 56.

Once the winding pallet 14 is moved to the downstream gripping arms 220, the downstream elevator moves the transport pallet 12 up into position against the winding pallet 14 and during such movement contact between the die portion 40 of the transport pallet 12 and the stator 22 moves the stator 22 back into its original reference position relative to the winding pallet 14. The downstream gripping arms 220 are then disengaged and the downstream elevator lowered to place the winding pallet 14 on transport pallet 12 arrangement back onto the conveyor lane 56 for movement down the line 54 to a next station. Where the combing arms 224 are mounted on the moving gripping arms 220 themselves, and where combing pins 226 are positioned adjacent the retaining studs 224, the outward release motion of the gripping arms 220 may further move the combing pins to pull the excess wire 223 further inward of the winding pallet 14.

The winding system and method hereinbefore described facilitates high speed winding of multiple stators by permitting one winding pallet to be wound while a next winding pallet is being loaded in position 82 just upstream of winding position 84. Similarly, a winding operation on a next winding pallet can begin before a just wound pallet is ever placed back on the conveyor lane. Other advantages of the system and method are recognizable.

Although the invention has been described above in detail referencing the preferred embodiments thereof, it is recognized that various changes and modifications could be made without departing from the spirit and scope of the invention.

For example, while the various linear actuators utilized in conjunction with the invention may be pneumatic cylinder arrangements, it is recognized that other linear actuators including but no limited to linear servo actuators such as ball screw type and linear motor type could be used and the hydraulically controlled linear actuators could be used. Further, while various of the linear actuator movements are shown or described as pushing movements, it is recognized that such pushing movements could likewise be pulling movements where the linear actuator would mounted at a different location relative to the move taking place. Likewise, and linear actuator movement described as a pull movement could in turn be a push movement.

Still further, while the pallet separation scheme shown in the illustrated embodiment involves a lift of both the transport pallet 12 and the winding pallet 14, it is recognized that other separation schemes could be used. For example, rather than lifting both the transport pallet 12 and the winding pallet 14, the gripping arms could be movable between a conveyor height and an upward position to simply hold the winding pallet 14 and lift it off the transport pallet 12. In such an arrangement the gripping arms might be brought down to the conveyor height after the transport pallet 12 reaches position 70 so that the biasing means 142 of the gripping arrangement could be brought into contact with the transport pallet 12. Alternatively, the gripping arrangement could already be at conveyor height when the transport pallet 12 moves into position 70 and the biasing means 142 could be configured to initially slidingly engage the transport pallet 12. In another pallet separation scheme the pivot arm 160 could be mounted for both pivotal and vertical movement at position 70 so that the winding pallet 14 is moved into the opposed slots 176 of the pivot arm 160 when the transport pallet and winding pallet move into position 70. The pivot arm could then be lifted vertically and then pivoted. Further, in some case the vertical movement of the pivot arm 160 may not be necessary. In these variations position 70 would represent the pallet separation station. Similar variations are possible at the pallet recombining side of the system. In still another arrangement the transport pallet 12 could be formed with opposed slots for holding the winding pallet 14. When the pallet combination reaches position 70 the two pallets could be elevated and then the winding pallet could be slid out of the transport pallet opposed slots and into the pivot arm (such as by use of a properly positioned linear actuator) in order to separate the winding pallet from the transport pallet. Such an arrangement might eliminate the need fro the gripping arms. Alternatively, when the pallet combination reaches position 70 the combination could be stopped and the winding pallet slid out of the transport pallet opposed slots directly into a pivot arm. Again, similar variations at the downstream side of the system could be employed. All of the variations of this paragraph represent alternative means for combining or separating the winding pallet and transport pallet.

In addition, while the wire combing structure of the illustrated embodiment is shown in association with the downstream gripping arms, it is also recognized that a suitable combing structure could possibly be positioned for contacting the excess wire 223 when the winding pallet 14 is slid from the winding position 84 to downstream position 88.

What is claimed is:

1. An automated stator winding method comprising:
   (a) providing a transport pallet and a winding pallet, the winding pallet removably positioned upon the transport pallet and a stator part mounted on the winding pallet;
   (b) conveying the transport pallet with winding pallet thereon on a conveyor along a substantially horizontal first direction to an input side of a winding station;
   (c) raising the transport pallet with winding pallet thereon above the conveyor;
   (d) holding the winding pallet in place as the transport pallet is lowered so as to separate the winding pallet from the transport pallet;
   (e) laterally moving the winding pallet in the first direction and into a first pivot arm;
   (f) pivoting the winding pallet through substantially ninety degrees to a first position alongside a winding position;
   (g) laterally moving the winding pallet in the first direction out of the first pivot arm and into the winding position;
   (h) performing a winding operation at the winding position;
   (i) laterally moving the winding pallet in the first direction into a second position alongside the winding position and into a second pivot arm;
   (j) pivoting the winding pallet through substantially ninety degrees to a position above the conveyor;
   (k) laterally moving the winding pallet in the first direction out of the second pivot arm and into a pallet combining position and holding the winding pallet in the pallet combining position;
   (l) laterally moving the transport pallet along the conveyor into a position below the pallet combining position;
   (m) raising the transport pallet up into contact with the winding pallet;
   (n) releasing the winding pallet so as to rest upon the transport pallet; and
   (o) lowering the transport pallet with winding pallet thereon back onto the conveyor.

2. The method of claim 1 wherein step (l) takes place during one or more of steps (e), (f), (g), (h), (i), (j) and (k).

3. The method of claim 1 wherein the movement of steps (e), (g), (i) and (k) takes place via action of respective linear actuators.

4. The method of claim 1 wherein after step (f) and prior to step (g) a position of the stator with respect to the winding pallet is set to a winding reference position.

5. The method of claim 4 wherein step (m) includes setting a position of the stator with respect to the winding pallet to a second reference position different than the winding reference position.

6. The method of claim 1 wherein the pallet holding operations of steps (d) and (k) involve the use of respective pairs of gripping arms.

7. An automated stator winding method comprising:
   (a) providing a transport pallet and a winding pallet, the winding pallet removably positioned upon the transport pallet and a stator part mounted on the winding pallet;
   (b) conveying the transport pallet with winding pallet thereon to an input side of a winding station;
   (c) separating the transport pallet from the winding pallet;
   (d) pivoting the winding pallet into a first position alongside a winding position;

(e) laterally moving the winding pallet into the winding position;

(f) performing a winding operation at the winding position;

(g) laterally moving the winding pallet into a second position alongside the winding position;

(h) pivoting the winding pallet away from the second position and into a third position; and (i) placing the winding pallet back onto the transport pallet;

wherein each of steps (b), (c), (d), (e), (f), (g), (h) and (i) are performed by automated machinery.

8. The method of claim 7 wherein step (c) involves raising the transport pallet with winding pallet thereon above a conveyor and holding the winding pallet in place as the transport pallet is lowered.

9. The method of claim 7 wherein step (c) involves lifting the winding pallet off the transport pallet while the transport pallet remains on a conveyor.

10. The method of claim 7 wherein after step (c) and prior to step (d) the winding pallet is moved laterally into a first pivot arm, and wherein after step (h) and prior to step (i) the winding pallet is moved laterally out of a second pivot arm.

11. The method of claim 7 wherein after step (e) and prior to step (f) a position of the stator with respect to the winding pallet is set to a winding reference position.

12. The method of claim 11 wherein step (i) includes setting a position of the stator with respect to the winding pallet to a second reference position different than the winding reference position.

13. The method of claim 7 further comprising the step of after the winding operation contacting stator coil wires connected to retaining studs on the winding pallet so as to move the wires inward on the winding pallet.

14. The method of claim 13 wherein the contacting step occurs after step (h) and before step (i).

15. An automated stator winding method comprising:

(a) providing a transport pallet and a winding pallet, the winding pallet removably positioned upon the transport pallet and a stator part mounted on the winding pallet;

(b) conveying the transport pallet with winding pallet thereon to a winding station;

(c) separating the transport pallet from the winding pallet;

(d) moving the winding pallet into a winding position;

(e) performing a winding operation at the winding position;

(f) after step (e), placing the winding pallet back onto the transport pallet;

wherein each of steps (b), (c), (d), (e) and (f) are performed by automated machinery.

16. The method of claim 15 wherein step (c) involves raising the transport pallet with winding pallet thereon above a conveyor and holding the winding pallet in place as the transport pallet is lowered.

17. The method of claim 15 wherein step (c) involves lifting the winding pallet off the transport pallet while the transport pallet remains on a conveyor.

18. The method of claim 15 wherein step (c) takes place at a first location along a conveyor line and step (f) takes place at a second location along the conveyor line, the second location is downstream of the first location.

19. The method of claim 15 wherein a winding machine is alongside a conveyor and step (d) includes pivoting the winding pallet toward the winding machine.

20. The method of claim 19 wherein step (d) includes moving the winding pallet into a pivot arm.

21. The method of claim 15 wherein step 9 (f) takes place above a conveyor.

22. The method of claim 15 wherein after step (c) and prior to step (e) a position of the stator part with respect to the winding pallet is adjusted to move the stator part to a winding reference position.

23. The method of claim 22 wherein after step (e) a position of the stator part with respect to the winding pallet is adjusted to a second reference position different than the winding reference position.

24. The method of claim 15 wherein the winding operation places a number of stator coil wire ends on retaining studs of the winding pallet and the method further involves contacting the stator coil wire ends so as to move the wires inward on the winding pallet.

25. The method of claim 24 wherein the contacting step occurs after step (e) and before step (f).

26. An automated stator winding method comprising:

(a) providing a transport pallet and a winding pallet, the winding pallet removably positioned upon the transport pallet and a stator part mounted on the winding pallet;

(b) separating the transport pallet from the winding pallet;

(c) moving the separated winding pallet into a winding position;

(d) performing a winding operation at the winding position;

(e) after step (d), placing the separated winding pallet back onto the transport pallet;

wherein each of steps (b), (c), (d) and (e) are performed by automated machinery.

27. The method of claim 26 wherein step (c) involves first moving the separated winding pallet to a position alongside the winding position and then moving the separated winding pallet laterally into the winding position.

28. The method of 27 wherein the separated winding pallet is pivoted into the position alongside the winding position.

29. The method of claim 27 wherein a position of the stator part with respect to the winding pallet is adjusted at the position alongside the winding position to move the stator part to a winding reference position.

30. The method of claim 26 wherein step (b) involves raising the transport pallet with winding pallet thereon above a conveyor and holding the winding pallet in place as the transport pallet is lowered.

31. The method of claim 26 wherein step (b) involves lifting the winding pallet off the transport pallet while the transport pallet remains on a conveyor.

32. The method of claim 26 wherein step (b) takes place at a first location along a conveyor line and step (e) takes place at a second location along the conveyor line, the second location is downstream of the first location.

* * * * *